United States Patent [19]

Gregory et al.

[11] Patent Number: 5,331,487
[45] Date of Patent: Jul. 19, 1994

[54] DIRECT ACCESS STORAGE DEVICE WITH VAPOR PHASE LUBRICANT SYSTEM AND A MAGNETIC DISK HAVING A PROTECTIVE LAYER AND IMMOBILE PHYSICALLY BONDED LUBRICANT LAYER

[75] Inventors: Thomas A. Gregory; Ajay Johary; Christopher G. Keller; Ronald G. Lecander; James J. Mayerle, all of Rochester, Minn.

[73] Assignee: International Business Machines Corporation, Armonk, N.Y.

[21] Appl. No.: 822,005
[22] Filed: Jan. 16, 1992
[51] Int. Cl.$^5$ .............................................. G11B 5/00
[52] U.S. Cl. .................................. 360/97.02; 360/135; 428/64; 428/65; 428/694 TP; 428/694 TF; 428/694 TC; 428/900
[58] Field of Search ............. 428/64, 65, 695, 694 TP, 428/694 TF, 694 TC, 900; 360/97.02, 97.03, 135

[56] References Cited

U.S. PATENT DOCUMENTS

| | | | |
|---|---|---|---|
| 4,419,164 | 12/1983 | Martinelli | 156/244.11 |
| 4,581,245 | 4/1986 | Nakamura et al. | 427/40 |
| 4,604,672 | 8/1986 | Davis et al. | 360/137 |
| 4,642,246 | 2/1987 | Janssen et al. | 427/127 |
| 4,709,816 | 12/1987 | Matsumoto et al. | 206/444 |
| 4,713,287 | 12/1987 | Nishikawa et al. | 428/336 |
| 4,789,913 | 12/1988 | Gregory et al. | 360/97.03 |
| 5,049,410 | 9/1991 | Johary et al. | 427/131 |
| 5,071,715 | 12/1991 | Shoji et al. | 428/694 |
| 5,138,506 | 8/1992 | Beck et al. | 360/97.03 |
| 5,143,787 | 9/1992 | Frew et al. | 427/408 |

FOREIGN PATENT DOCUMENTS 2155810 10/1985 United Kingdom.

OTHER PUBLICATIONS

IBM Technical Disclosure Bulletin, vol. 26, No. 1, Jun. 1983 "Plasma Ash or Laser Burn Pattern of Submicron Holes at Disk ID for Improved Lubricant Distribution With Time" by C. J. Mastrangelo.
IBM Technical Disclosure Bulletin, vol. 28, No. 2, Jul. 1985 "Lubricant-Stabilizing Structure for Magnetic Disks" by M. R. Lorenz.
IBM Technical Disclosure Bulletin, vol. 30, No. 3, Aug. 1987 "Lubricating Coatings for Magnetic Discs" by G. Y. Onoda.
IBM Technical Disclosure Bulletin, vol. 30, No. 6, Nov. 1987, "Overcoat on Metallic Magnetic Disks" by U. Bandara, J. Kempf, G. Kraus and W. Steiner.
IEEE Transactions on Magnetics, vol. Mag-23, No. 1, Jan. 1987, "Duplex Reactive Fluorocarbon Films With Spin-Off Resistant Characteristics" by M. Barlow, M. Braitberg, L. Davis, V. Dunn and D. Frew.

Primary Examiner—Stevan A. Resan
Attorney, Agent, or Firm—Richard E. Billion; Roy W. Truelson

[57] ABSTRACT

A thin film magnetic recording disk that has a layer of lubricant bonded thereto is enclosed within a vapor phase lubricant system that operates to continuously apply lubricant vapors to the disk's bonded lubricant layer by operation of Langmuir kinetics. Lubricant vapors are selectively adsorbed on the disk, including regions of the disk where the bonded lubricant is either too thin or is entirely absent, thus minimizing failures that might be caused by such imperfections in the bonded lubricant layer. A reactive perfluoropolyether (PFPE) lubricant containing chemically active functional groups is substantially bonded onto the recording surface of the disk, for example by the application of heat. The mobile residue of this bonded lubricant layer may be left on the disk, to thereafter function as a non-bonded, mobile, lubricant layer covering the surface of the bonded lubricant layer. Alternately, the lubricant residue may be substantially removed by use of a solvent or other means, and a nonreactive lubricant, such as a nonreactive PFPE, may thereafter be topically applied onto the surface of the bonded lubricant layer, to function as a non-bonded, mobile, lubricant layer. A lubricant reservoir within the vapor phase lubricant system provides a supply of a volatile organic lubricant, such as stearic acid or reactive or a nonreactive PFPE. Lubricant vapors from this reservoir operate so as to continuously repair voids or thin areas in the disk's simplex layer of substantially bonded lubricant, or in the disk's duplex layer of bonded and mobile lubricant. Either one, two or three lubricants could be used in this tribological system.

22 Claims, 2 Drawing Sheets

DIRECT ACCESS STORAGE DEVICE WITH VAPOR PHASE LUBRICANT SYSTEM AND A MAGNETIC DISK HAVING A PROTECTIVE LAYER AND IMMOBILE PHYSICALLY BONDED LUBRICANT LAYER

FIELD OF THE INVENTION

This invention relates to magnetic data recording, and more specifically to lubricant systems for magnetic recording media such as thin film magnetic recording disks of the hard or rigid type.

RELATED INVENTIONS

Commonly assigned U.S. Pat. No. 4,789,913, by T. A. Gregory et al, and entitled Method and Apparatus for Lubricating a Magnetic Disk Continuously in a Recording File, is incorporated herein by reference. This related patent describes a lubricant reservoir system that is useful in the present invention. The reservoir system of this patent operates to continuously supply lubricant vapors to magnetic recording disks by way of Langmuir adsorption kinetics. Suitable volatile lubricants are described therein.

Commonly assigned U.S. Pat. No. 5,229,899, by C. A. Brown et al, and entitled Vapor Drain, is incorporated herein by reference. This related patent application describes a magnetic disk storage device that is useful in the present invention, wherein a layer of organic lubricant is maintained on the disk's recording surface by way of a controlled vapor pressure, including vapor drain means for effecting a controlled withdrawal of lubricant vapor from the storage device enclosure.

BACKGROUND OF THE INVENTION

A critical feature of rigid, magnetic data, disk storage devices is vulnerability to failure of the storage device as a result of the read/write transducing head slider wearing into the magnetic layer that is located on the disk's surface. Magnetic data storage improvements have been achieved by using a thin film magnetic coating, for example, in the range of about 25 nanometers thick, and by using a low head flying height, for example in the range of about 5 micro inches. Both of these factors require the tribology of the disk to be excellent in order for a useful lifetime to be achieved for the storage device. Generally, a thin film of lubricant molecules is required as part of the disk's tribological system. This lubricant film provides a low coefficient of friction when the head slider lands on the disk, for example as part of a start/stop operation, or when the head slider intermittently hits the disk while flying relative thereto.

As a result, the use of lubricants on the recording surface(s) of a magnetic recording disk is well known in the art. Generally, these lubricants are supplied as thin layers, for example from one to many monomolecular layers thick.

In the art of rigid, thin film memory disks, a lubricant is conventionally used to reduce friction, to prevent head stiction in the start/stop (S/S) area of the disk, and to provide a debris-free flying interface for the disk and its read/write transducing head.

Fluorocarbon lubricants are commonly used in a rotating rigid disk direct access storage device (DASD). These lubricants possess the desirable properties of chemical inertness, low surface tension, low volatility, and in addition these lubricants can be moisture repellant and can retard corrosion. However, these lubricants have a disadvantage in that they tend to centrifugally migrate to the outer edge of the disk, due to the force of disk rotation. This lubricant migration can lead to increased interference at the head/disk interface, and may eventually lead to complete failure of the interface.

The above mentioned related inventions describe disk lubrication systems wherein a reservoir contains a volatile organic lubricant. This volatile lubricant operates to continuously supply lubricant vapors to the recording surface of a magnetic recording disk.

Another approach to disk lubrication is to chemically bond a single, or simplex, layer of lubricant molecules to the disk's recording surface. In this case the lubricant is immobilized due to strong physical adsorption or weak pseudo-molecular bonding of the lubricant to the underlying disk surface. As a result, the lubricant does not appreciably evaporate from the recording surface over an extended period of use, nor does the lubricant gradually spin off of the disk surface as a function of the disk's high speed of rotation. Examples of such bonded lubricants are perfluoropolyethers (PFPE) having various hydrocarbon functional groups. The functional groups of these perfluoropolyether lubricants are active in bonding the lubricant molecules to the disk's recording surface. A sputtered carbon overcoat layer typically provides an active overcoat surface on the thin film magnetic layer, to which overcoat surface the lubricant is bonded. Other sputtered overcoat layers are also used. In this arrangement, after the lubricant is topically applied to the overcoat layer, the lubricant is bonded thereto by the application of heat, E-beam or by another source of irradiation that effects bonding of the lubricant molecules to the magnetic recording layer, or to the overcoat layer when one is used.

In this type of a bonded lubricant system, we have observed that the bonded lubricant layer usually does not provide uniform coverage of the disk's overcoat or thin film magnetic recording layer. Voids or thin areas tend to occur in the layer of bonded lubricant. This lack of integrity in the bonded lubricant layer may occur as a result of natural defects that occur during the bonding process or manufacturing process, or this lack of layer integrity may result from wear to the disk's surface during data processing.

Duplex layer, i.e. two layer, lubricant coatings on the magnetic recording layer of magnetic recording media is known in the art.

Such a duplex lubricant system can be formed subsequent to providing the above mentioned bonded lubricant layer, in which case it is customary to either leave the residual unbonded lubricant on the disk surface, to thereafter function as a second, mobile, lubricant layer, or the residual lubricant may be washed off after the bonding step, and a second unbonded lubricant layer may be topically applied, to thereby form a duplex lubricant coating on the disk. However, even such a duplex lubricant system is likely to develop nonuniform lubricant coverage (i.e. voids and/or thin areas).

The publication IEEE Transactions on Magnetics, Vol. MAG-23, No. 1, January 1987, at pages 33-35 describes the use of duplex fluorocarbon films, one film being chemically and permanently bonded to the media surface, and the other film being a lubricant that is overcoated onto the primed disk surface. The top lubricant is said to have the properties typical of a liquid lubricant.

UK Patent Application GB 2,155,810 A describes a magnetic recording medium comprising a non-magnetic substrate, a magnetic recording ferromagnetic film on one side of the substrate, and a topcoat layer formed on the surface of the recording layer, the topcoat layer comprising a radiation curable antioxidant and a lubricant.

U.S. Pat. No. 4,642,246 describes a process for lubricating a magnetic disk comprising contacting the disk with a functionalized lubricant having at least one functional terminal group, heating the lubricant so as to bond the functional terminal group to the surface of the disk, and then contacting the disk with a non-functionalized lubricant.

U.S. Pat. No. 4,713,287 describes a magnetic recording medium comprising a support having a thin magnetic film thereon, a thin layer of a fluorinated polymer on the magnetic film, and a lubricating agent coated on the polymer layer.

As stated previously, the above mentioned related inventions describe lubricant reservoir systems that operate to continuously supply lubricant vapors to magnetic recording disks by way of Langmuir adsorption kinetics.

While prior disk lubrication systems have been generally acceptable, as the data handling requirements of thin film magnetic recording disks increase, it is desirable that lubrication of the disks also be improved.

SUMMARY OF THE INVENTION

This invention provides a lubricant system for magnetic recording media such as thin film magnetic recording disks of the hard or rigid type. More specifically, this invention provides a DASD device having a lubricant system that includes a lubricant reservoir operating to supply a volatile lubricant to the bonded lubricant layer of a magnetic disk, the vapor phase supplied lubricant operating to lubricate the disk in the areas thereof at which the bonded lubricant is either missing or depleted.

An object of the invention is to provide Langmuir kinetics reservoir means for adding a lubricant, such as a volatile hydrocarbon or fluorocarbon, to lubricant depleted areas of a magnetic recording disk having a layer of bonded lubricant thereon.

The use of an immobilized, bonded, lubricant layer on a magnetic recording disk would lead those skilled in the art to believe that the additional use of a reservoir system to dynamically and continuously add lubricant vapors to the disk would produce no additional advantage relative to the manner in which the disk was lubricated during its lifetime. Those skilled in the art generally believe that since the bonded lubricant layer has been immobilized, evaporation or spin-off of the lubricant will not occur.

We have discovered, however, that nonuniform surface coverage by the bonded lubricant layer may initially occur, or may occur later in the life of the DASD device. Examples of nonuniform surface coverage are voids or thin areas within the disk's bonded lubricant layer. While one skilled in the art would believe that bonded lubricant disks have been lubricated for the life of the disk, we have discovered that the reservoir system of the present invention unexpectedly operates to provide continuously repairing of voids and thin areas in the bonded lubricant layer. This is accomplished by continuously supplying these areas with lubricant vapors by operation of Langmuir adsorption kinetics.

An object of the invention is to provide a lubricant reservoir system, such as is described in the above mentioned related patent and copending patent application, wherein lubricant vapors are continuously supplied to a magnetic recording disk having lubricant molecules bonded to the disk's recording surface. In this way, nonuniform surface coverage by the bonded lubricant, that is voids or thin areas within the disk's bonded lubricant layer, are continuously repaired by supplying these areas with lubricant vapors by operation of Langmuir adsorption kinetics.

The lifetime of DASD files constructed and arranged in accordance with the invention is appreciably increased because both initial and later occurring voids and inoperative thin areas in the bonded lubricant layer are repaired and continuously maintained over the lifetime of the DASD file.

As discussed previously, bonded lubricant layers, including duplex layers of a bonded and an unbonded lubricant, do not reliably provide a continuous lubricant interface to the slider of the disk's transducing head. Thin areas or voids are usually present in the bonded lubricant layer at the time of initial disk manufacture, and also tend to develop over a period of extended use. We have found that these thin or void areas have sufficient surface energy to cause adsorption of lubricant vapors to occur from the vapor phase that is provided by the vapor reservoir of the invention.

This invention utilizes reservoir systems of the type described in the above mentioned related patent and copending patent application to provide a lubricant adsorbate that deposits onto the regions of a thin film magnetic recording disk where its layer of bonded lubricant is defective or is inadequately thin. The lubricant used in the bonded layer and in the vapor reservoir can be the same, or they can be different type lubricants. In the case of the use of a mobile lubricant layer as a portion of a duplex lubricant layer system, the mobile layer can exhibit a very wide range of volatility and can even be a lubricant of a third type.

Within the teachings of the present invention, the lubricant reservoir may comprise a volatile lubricant of the same type that is topically applied to the bonded lubricant layer during manufacture of the disk.

A further object of the invention is to provide the combination of a vapor phase lubricant system and a thin film magnetic recording disk having a bonded lubricant layer thereon, wherein the disk is enclosed within the housing of a DASD device that includes a vapor phase lubricant system as a portion thereof, the vapor phase lubricant system operating to continuously apply lubricant vapors to the disk's bonded lubricant layer by operation of Langmuir kinetics, so as to cause lubricant vapors to be selectively adsorbed on the disk's surface, including portions of the disk whereat the bonded lubricant layer is either too thin or is entirely absent or ultimately becomes depleted. The lubricant vapors from a vapor reservoir operate to continuously repair voids or thin areas in the disk's bonded lubricant layer, thus minimizing failures that might be caused by such imperfections in the bonded lubricant layer. A reactive perfluoropolyether (PFPE) lubricant is preferred as the bonded lubricant material.

These and other objects and advantages of the invention will be apparent to those of skill in the art upon reference to the following description, which description makes reference to the drawing.

DETAILED DESCRIPTION OF THE INVENTION

This invention relates to an improved lubricant system for magnetic recording media such as thin film magnetic recording disks of the hard or rigid type, wherein lubrication of the disk is improved over that which was possible in prior disk lubrication systems.

More specifically, in accordance with the invention a relatively thin layer (i.e. about 2 to 25 angstroms thick) of lubricant is bonded to the magnetic recording surface of a thin film recording disk. Disks of this type are then placed in a DASD drive that is fitted with a reservoir system as described in the above mentioned related patent and/or copending patent application. As a result, an adsorbed layer of volatile lubricant is deposited on all regions of the disk where the layer of bonded lubricant lacks integrity, i.e. where voids occur or where the layer is relatively thin to nonexistent of more than about 15 square angstroms surface area.

The thickness of this adsorbed lubricant layer can be controlled to be within the range of about 1 to about 20 angstroms thick, in the manner described in these related inventions.

If desired, a second, mobile, unbonded, lubricant layer may be topically applied to the disk's bonded lubricant layer prior to placing the disk in the DASD file that is fitted with the above mentioned reservoir system.

Figure 1:
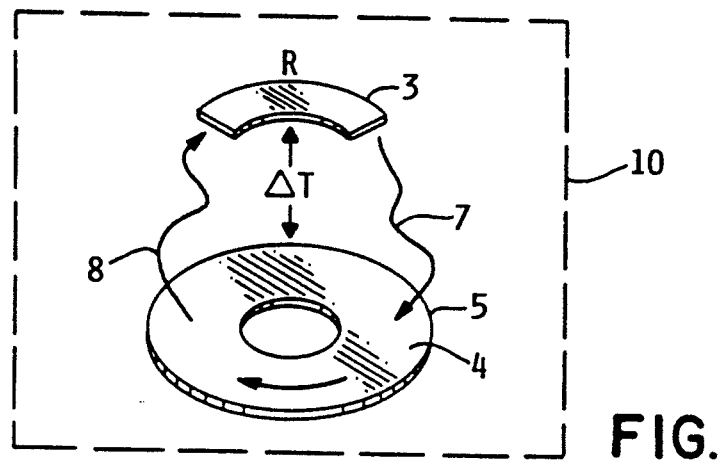
FIG. 1 is a schematic showing of a DASD device having a bonded lubricant disk and a vapor transport system in accordance with the invention, the vapor transport system being of the type described in above mentioned U.S. Pat. No. 4,789,913.

FIG. 1 is a schematic showing of a DASD device having a bonded lubricant disk 5 and a vapor transport system 3,7,8 in accordance with the invention, the vapor transport system being of the type described in above mentioned U.S. Pat. No. 4,789,913.

The equilibrium lubricant vapor transfer system of FIG. 1 reliably provides a replenishable, renewable, monomolecular layer of lubricant vapor molecules onto the bonded lubricant surface 4 of disk 5 and voids in said lubricant surface.

In accordance with the present invention, a saturated lubricant atmosphere emerges from the outlet of reservoir 3, as is represented by air flow arrow 7. Air flow 7 then warms slightly to achieve about 80% of saturation, whereupon disk 5 is allowed to communicate with the adjusted environment of air flow 7, which allows lubricant vapor molecules to adsorb onto the bonded lubricant surface 4 of disk 5. Lubricant vapor molecules also migrate from bonded lubricant surface 4 back to reservoir 3, as is represented by air flow arrow 8. Air flow 7,8 is, for example, induced by rotation of disk 5.

Maintenance of the correct film thickness of vapor lubricant on bonded lubricant surface 4 is dependent upon the existence of a temperature difference "delta T", i.e. it is dependent upon a lower temperature existing at reservoir 3 than at bonded lubricant surface 4.

Figure 2:
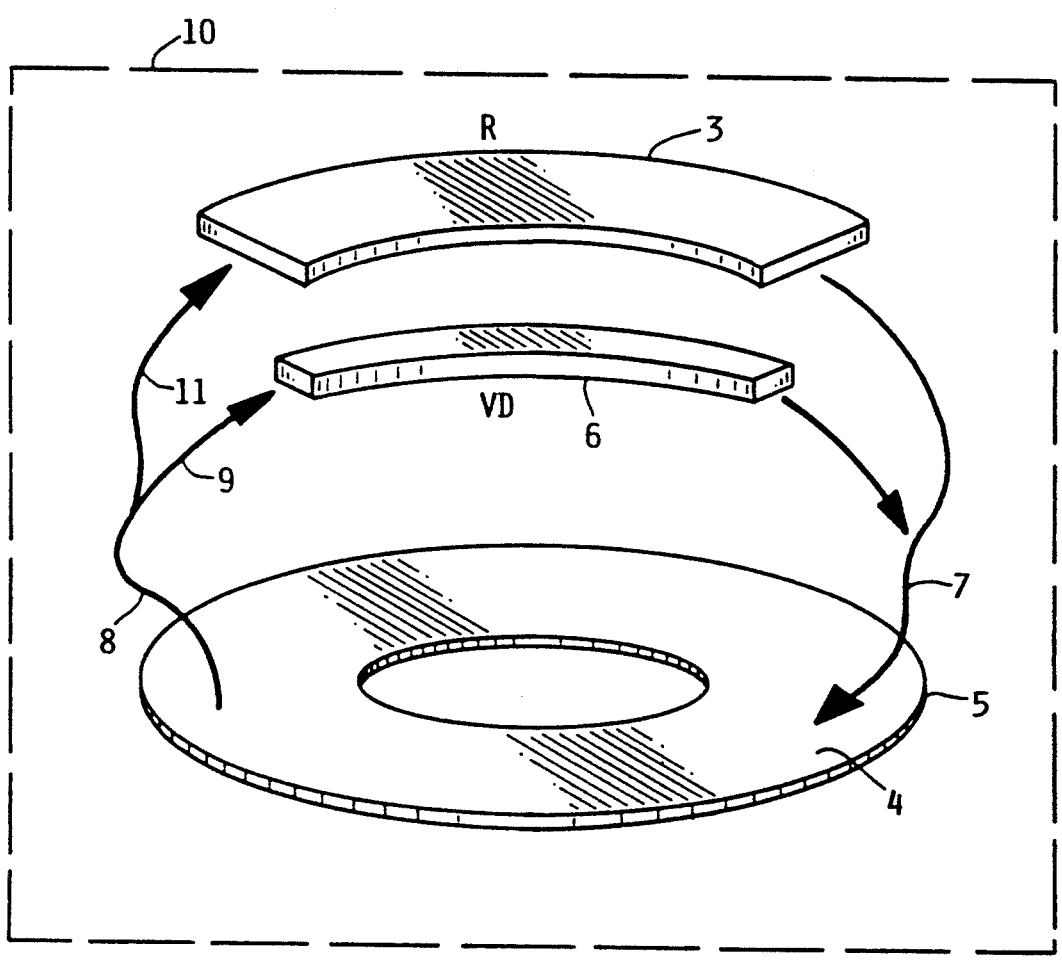
FIG. 2 is a schematic showing of a DASD device having a bonded lubricant disk and a vapor transport system in accordance with the invention, the vapor transport system being of the type described in above mentioned U.S. Pat. No. 4,789,913 and in above mentioned U.S. Pat. No. 5,229,899 by C. A. Brown et al.

FIG. 2 is a schematic showing of a DASD device having a bonded lubricant disk 5 and a vapor transport system 3,6,7,8,9,11 in accordance with the invention, the vapor transport system being of the type described in above mentioned U.S. Pat. No. 4,789,913 and U.S. Pat. No. 5,229,899 by C. A. Brown et al.

In the steady state condition of the lubricant vapor transfer system of FIG. 2, a replenishable, renewable, monomolecular layer of lubricant vapor molecules is again supplied to the bonded lubricant surface 4 of disk 5 by operation of air flow 7,8,9,11. However, in this embodiment of the invention, a vapor drain device 6 is provided to remove contaminant vapors together with lubricant vapors from within the DASD enclosure 10, such as contaminant organic vapors that are outgassed from other devices or materials (not shown) that are associated with disk 5 within the enclosure or housing 10 of the DASD device. Vapor drain device 6 functions as a chemical filter that operates to trap organic vapors from air flow 9, which is a minor component of about 20% of the air flow 8. Air flow 9 then emerges from vapor drain device 6 with an organic vapor pressure that is substantially zero. Air flow 11 is a major component of air flow 8, which enters lubricant reservoir 3 and emerges with its air flow saturated with lubricant vapors. Since the composite atmosphere that is supplied from reservoir 3 and from vapor drain device 6 is less than saturated with lubricant vapor, the vapor transfer system of FIG. 2 need not be dependent upon maintaining reservoir 3 at a reduced temperature relative to bonded lubricant layer 4.

As a feature of the invention, a volatile PFPE lubricant or the hydrocarbon lubricant used in the reservoir means 3 of FIGS. 1 and 2 is selected from the group hydrocarbon alcohols, hydrocarbon esters, stearic acid, palmitic acid and other carboxylic acids.

In FIGS. 1 and 2, broken line 10 defines the substantially closed housing in which the various DASD components, such as the magnetic read/write head that forms a data transducing interface to disk 5, the track seeking head access mechanism, etc. are contained, as is well known to those of skill in the art. For example, housing 10 may be as is shown above mentioned copending U.S. application Ser. No. 07/432,940, now U.S. Pat. No. 5,130,506 by J. L. Beck et al.

Figure 3:
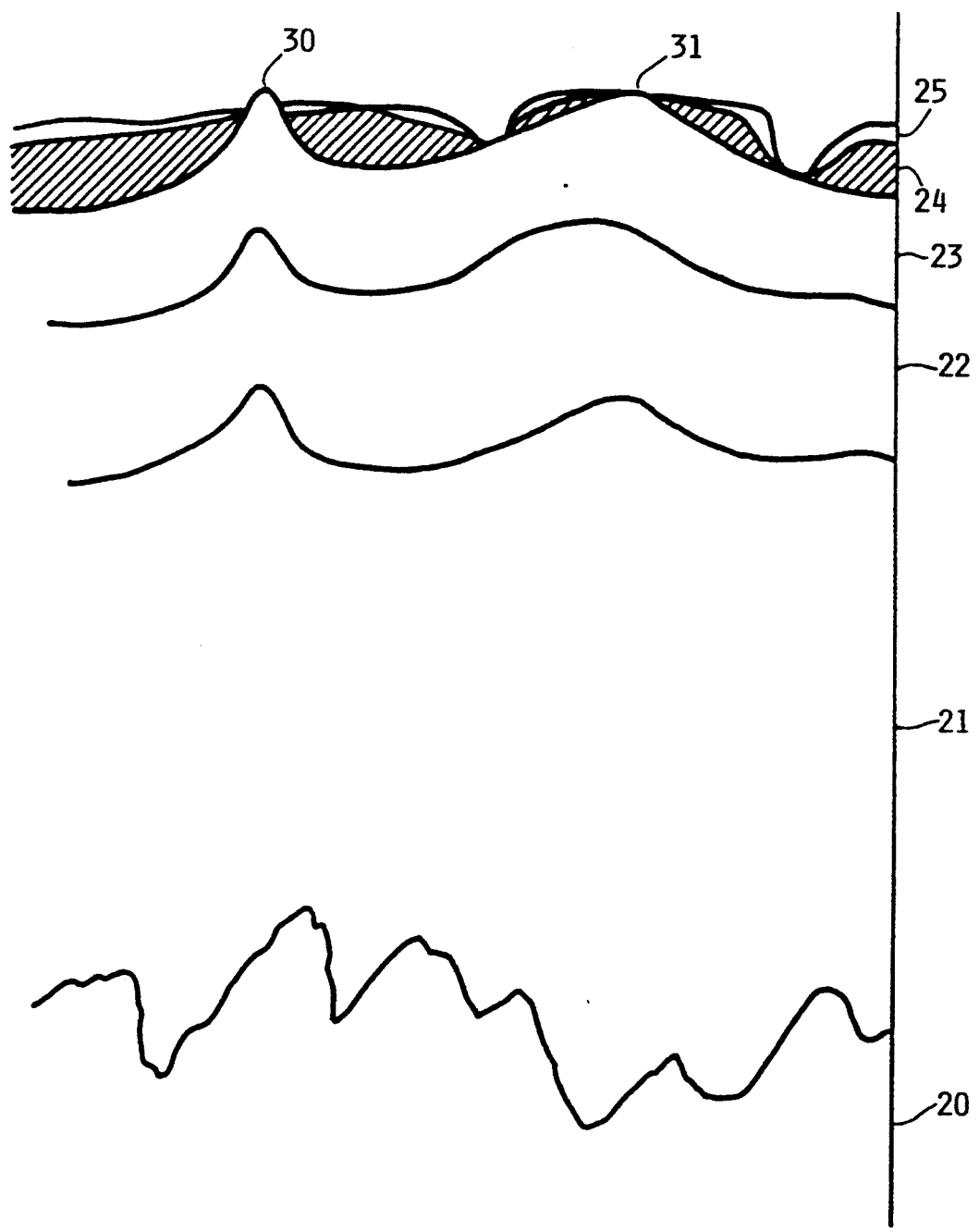
FIG. 3 is a partial side section view of the disks of FIGS. 1 and 2, wherein the disk is provided with a carbon overcoat layer and a duplex lubricant layer comprising a bonded lubricant layer of PFPE and a mobile or unbonded lubricant layer, and wherein an exaggerated form of a void and a depleted area are shown in the duplex lubricant layer.

FIG. 3 is a partial side section view of a preferred form of rigid, thin film, magnetic recording disk 5 to be used in the DASD devices of FIGS. 1 and 2.

While not critical to the spirit and scope of the invention, disk 5 includes a flat, disk-shaped, nonmagnetic substrate member 20, such as an aluminum disk. As is well known in the art, it is conventional to form a metal layer 21 of uniform composition on substrate member 20. Layer 21 is preferably a plated nickel phosphorus (NiP) layer 7 to 16 microns thick. The exposed surface of NiP layer 21 is highly polished, and in accordance with industry practice, this polished surface may be provided with a texture upon which a thin film magnetic layer 22, 150 to 300 angstroms thick, is sputter deposited with a preferred crystal orientation.

In the preferred form of the invention, disk 5 is a thin film magnetic recording disk. In order to manufacture such a disk, a thin, cobalt-based (e.g. Co/Pt/Cr, Co/Pt or Co/Cr) magnetic layer 22 is sputter deposited on the exposed and textured surface of NiP layer 21. The manner of depositing magnetic layer 22 is not critical to the invention, and various methods are well known to those of skill in the art.

A preferred feature of the invention is to provide a sputter deposited, carbon-containing, overcoat 23 layer, 75 to 300 angstroms thick, on the exposed surface of magnetic recording layer 22.

In a preferred embodiment of the invention, overcoat layer is comprised of sputter applied high-purity carbon using a substantial Argon plasma with other gas additives being optional.

An overcoat layer of the above composition has been found to provide the necessary attachment sites for a PFPE bonded lubricant layer 24.

The embodiment of the invention shown in FIG. 3 is that of a thin film magnetic recording disk having a duplex lubricant layer comprising a bonded lubricant layer 24 of a reactive perfluoropolyether (PFPE), in the range of about 2 to 25 angstroms thick, and a mobile or unbonded lubricant layer 25, in the range of about 1 to 25 angstroms.

The lubricant material that is selected in accordance with the invention for use in bonded layer 24 is a reactive material in that the molecules thereof are bonded to the underlying layer by way of the application of an activating physical phenomenon such as an elevated temperature. In order for bonding to occur, the underlying layer, be it magnetic recording layer 22 or overcoat layer 23, must provide sites having an affinity for attachment of the molecules of bonded layer 24.

A preferred lubricant for use in bonded layer 24 is the linear PFPE Fomblin Z-Dol, having a molecular weight of about 2000 atomic mass units (amu) and hydrogenated methylene hydroxide mono or bi-functional end groups, manufactured by Montefluos of Milan, Italy.

In one method of applying bonded lubricant layer 24, the disk consisting of 20,21,22,23 was dipped in a quantity of Z-Dol (8 grams of Z-Dol per liter of 1,1,2-Trichlorotrifluoroethane, and then slowly withdrawn (at a rate of 2 millimeters per second), thereby leaving a liquid application of Z-Dol on the disk, about 70 to 80 angstroms thick. The disk was then baked in an oven at about 150 degrees C. for about 1 hour. The result was a bonded lubricant layer 12 to 24 angstroms thick. At the end of the baking interval, the disk contained a residual mobile layer 25 of unbonded Z-Dol, about 9 angstroms thick and of a molecular weight about 5000 amu. As noted, this higher molecular weight Z-Dol layer can be left on the disk, to function as the mobile lubricant layer 25 of FIG. 3, or this residual layer of mobile Z-Dol can be substantially removed, washed off by the application of 1,1,2-Trichlorotrifluoroethane. The disk can then be used in the DASD device, with a protective adsorbate film 25 thereafter being provided by the lubricant vapors from reservoir 3 after the disk is installed in the DASD device. In the alternative, after this residual mobile layer of Z-Dol has been washed off, a mobile lubricant layer 25 may be applied, whereupon the disk is installed in the DASD device.

A preferred material for use in bonded lubricant layer 24 is selected from the group of PFPE lubricants whose molecules include various hydrocarbon groups that function to bond the lubricant molecules to the surface of magnetic recording layer 22, or to the surface of optional overcoat layer 23. These PFPE materials are defined herein as reactive PFPE.

Mobile or unbonded lubricant layer 25 is preferably a nonreactive lubricant that has been topically applied to bonded lubricant layer 24 after the reactive PFPE material of layer 24 has been bonded to overcoat layer 23, and after any unbonded residual reactive PFPE material has been washed away. The selection of a material for unbonded lubricant layer 25 is not critical to the invention, and a nonreactive PFPE may be used.

As a feature of the invention, mobile lubricant layer 25 comprises a topically applied lubricant that has limited volatility, and is of a different type from the volatile lubricant that is used in reservoirs 3 of FIGS. 1 and 2. In this way, three different disk lubricants can be provided, i.e. bonded layer 24, mobile layer 25 and the lubricant vapors that are supplied to disk 5 by reservoir 3.

FIG. 3 also shows an exaggerated form of a void 30 and a depleted area 31 in duplex lubricant layer 24,25; both defect types are typically associated with the protruding summits of the deliberate texture used in this technology. Lubricant depleted areas such as 30,31 have sufficient surface energy so that lubricant vapors from reservoir 3 preferentially deposit on these areas, thus operating to dynamically and continuously repair duplex lubricant layer 24,25 by forming a relatively thin and protective adsorbate film, about 3 to about 30 angstroms thick, on such areas during the lifetime of disk 5. Thus the lubricant of reservoir 3, having a substantial vapor pressure, rapidly provides lubricant molecules to any damaged area that occurs within the disk's lubricant layer 24,25.

Since the vapor phase lubricant system 3,7,8,9,6 of the invention can be depended upon to repair the disk's lubricant system 24,25, the mobile, topically applied, lubricant layer 25 can be selected from relatively nonvolatile lubricants.

When a mobile lubricant layer is not provided on disk 5 at the time of the disk's manufacture, the protective adsorbate film that is provided by the lubricant vapors from reservoir 3, after the disk is installed in the DASD device, will function as such a mobile lubricant layer.

This description of preferred embodiments of the invention discloses means whereby the vapor phase lubricant system of the invention operates to dynamically apply lubricant to the disk's surface wherever the bonded lubricant layer is too thin or where a void exists in the bonded lubricant layer. Such defect conditions can arise during manufacture of the disk, when the bonded lubricant is applied, or such defects can result from wear to the disk during its use in the DASD device.

Other embodiments of the invention will be apparent to those of skill in the art. Thus it is intended that the spirit and scope of the invention be as is defined in the following claims.

What is claimed is:

1. An improved lubricant system for thin film magnetic recording disks, comprising:
   a DASD containing an enclosure, a lubricant reservoir and a lubricant vapor transport system cooperating with said reservoir to maintain a portion of the lubricant within said enclosure in a vapor phase, and a thin film magnetic recording disk within said DASD, said disk having a thin film magnetic recording layer at a surface thereof, and having a layer of a lubricant bonded to said thin film magnetic recording layer in a manner to render said lubricant substantially immobile.

whereby a renewable adsorbed layer of lubricant molecules is continuously provided on the surface of said immobile lubricant layer and to voids in said layer.

2. The lubricant system of claim 1 wherein the thickness of said bonded lubricant layer is in the average range of from about 2 to about 50 angstroms and where said bonded lubricant layer may have numerous voids, 3. The lubricant system of claim 2 wherein the average thickness of said adsorbed lubricant layer is in the range of from about 1 to about 20 angstroms, 4. The lubricant system of claim 3 including a mobile, unbonded, lubricant layer located intermediate to said bonded lubricant layer and said adsorbed lubricant layer.

5. The lubricant system of claim 4 wherein said vapor transport system comprises air flow within said DASD file, said air flow operating to release lubricant vapor molecules to said bonded lubricant layer, to thereby form said adsorbed lubricant layer thereon.

6. The lubricant system of claim 5 wherein said air flow is induced by rotation of said disk.

7. The lubricant system of claim 6 wherein said DASD includes vapor drain means functioning as a chemical filter to trap organic vapors from said air flow, and to thereby remove contaminant vapors from within said DASD file.

8. The lubricant system of claim 6 wherein said lubricant reservoir contains a PFPE lubricant or a hydrocarbon lubricant selected from the group hydrocarbon alcohol, hydrocarbon ester, and carboxylic acid.

9. A DASD having an improved lubricant system for maintaining head-to-disk lubrication of a thin film magnetic recording disk, comprising,
a substantially closed housing for containing compounds of said DASD device,
a rotatable thin film magnetic recording disk contained within said housing, said disk having a thin film magnetic recording layer and having a wear-resistant layer physically bonded to said thin film recording layer, and having an immobile lubricant layer physically bonded to said wear-resistant layer, and
a vapor phase lubricant system contained within said housing, said lubricant system operating to continuously apply lubricant vapors to said bonded lubricant layer and to voids in said lubricant layer by operation of Langmuir kinetics, said vapor phase lubricant system including a reservoir having a volatile lubricant material therein, and a lubricant vapor transport system cooperating with said reservoir and said disk, whereby a lubricant vapor layer is continuously provided on said bonded lubricant layer, including regions of said disk whereat said bonded lubricant layer is deficient because of the manufacturing process or becomes deficient during the lifetime of said DASD device.

10. The DASD of claim 9 wherein said vapor transport system comprises air flow within said housing, said air flow operating to release lubricant vapor molecules at the said bonded lubricant layer or to voids in said bonded lubricant layer, to thereby form an adsorbed layer of volatile lubricant molecules thereon.

11. The DASD of claim 10 wherein said air flow is induced by rotation of said disk.

12. The DASD of claim 11 wherein said bonded lubricant layer comprises a immobilized layer of a reactive perfluoropolyether (PFPE).

13. The DASD of claim 12 including a mobile layer of a nonreactive lubricant located intermediate to said bonded PFPE lubricant layer and said adsorbed lubricant layer.

14. The DASD of claim 13 wherein said bonded PFPE lubricant layer is formed by the application of heat to a reactive PFPE layer having a molecular weight about 2000 amu, and wherein said mobile lubricant layer comprises an unbonded layer of said PFPE which remains on said bonded PFPE lubricant layer after said application of heat, said remaining PFPE lubricant being nonreactive and having a molecular weight of about 5000 amu.

15. The DASD of claim 14 wherein the thickness of said bonded lubricant layer is in the range of from about 2 to about 25 angstroms, wherein the thickness of said adsorbed lubricant layer is in the range of from about 1 to about 20 angstroms, and wherein the thickness of said intermediate mobile layer of reactive and/or nonreactive PFPE lubricant is cumulatively in the range of from about 1 to about 25 angstroms.

16. The DASD of claim 15 including vapor drain means contained within said housing and functioning as a means to regulate vapor pressure of the volatile lubricant and also functioning as a chemical filter to trap organic vapors from said air flow, to thereby remove contaminant vapors that originate from within said housing of said DASD device.

17. The DASD of claim 16 wherein said lubricant reservoir contains a PFPE lubricant or a hydrocarbon lubricant selected from the group hydrocarbon alcohol, hydrocarbon ester, and carboxylic acid.

18. The DASD of claim 9 wherein said disk comprises a disk-shaped nonmagnetic substrate member having a protective layer of specific topography formed thereon, a sputter deposited cobalt-based magnetic film deposited on said protective layer, a sputter deposited carbon-containing overcoat layer deposited on said magnetic film, and a duplex lubricant layer comprising said bonded lubricant layer and a mobile lubricant layer.

19. The DASD of claim 18 wherein said bonded lubricant layer comprises a reactive lubricant material, the molecules of which are bonded to said overcoat layer by the application of an activating physical phenomenon, and wherein said mobile lubricant layer comprises a nonreactive lubricant material topically applied to said bonded lubricant layer after said reactive material has been bonded to said overcoat layer.

20. The DASD of claim 19 wherein said reactive lubricant material is selected from PFPE lubricants whose molecules include hydrocarbon groups that function to substantially bond the molecules thereof to said overcoat layer.

21. The DASD of claim 19 wherein said nonreactive lubricant material is a nonreactive PFPE containing no hydrocarbon functional groups.

22. The DASD of claim 19 wherein said volatile lubricant material, said reactive lubricant material and said nonreactive lubricant material comprise three different lubricant materials.

* * * * *